Dec. 18, 1928.　　　　　M. G. DUSSEAU　　　　　1,695,579

WHEEL ASSEMBLY

Filed May 13, 1925　　　2 Sheets-Sheet 1

Inventor
Maurice G. Dusseau,

By
Attorneys

Dec. 18, 1928.  M. G. DUSSEAU  1,695,579
WHEEL ASSEMBLY
Filed May 13, 1925   2 Sheets-Sheet 2

Inventor
Maurice G. Dusseau,
By
Attorney

Patented Dec. 18, 1928.

1,695,579

UNITED STATES PATENT OFFICE.

MAURICE G. DUSSEAU, OF ALLSTON, MASSACHUSETTS.

WHEEL ASSEMBLY.

Application filed May 13, 1925. Serial No. 29,954.

In Patent No. 1,387,967 dated Aug. 16, 1921, there is disclosed a drive wheel assembly including a steering knuckle through which power may be transmitted for driving the wheel steered by the knuckle, and the power transmission mechanism includes a universal joint arranged so that the driving relation between the live axle and the wheel may at all times be in the plane of the wheel. This invention attains the same objects set forth in the above mentioned patents and includes certain improvements or refinements that afford a more compact, durable and easily manufactured construction.

One of the improvements is in connection with the universal joint, another in connection with bearings and packing, and another in the design of the parts to facilitate assembling. All of these improvements will be hereinafter specifically described and then claimed, and reference will now be had to the drawings, wherein Figure 1 is a vertical longitudinal sectional view of the hub portion of a wheel assembly in accordance with this invention;

Fig. 3 is a plan of the universal joint;

Figure 1:
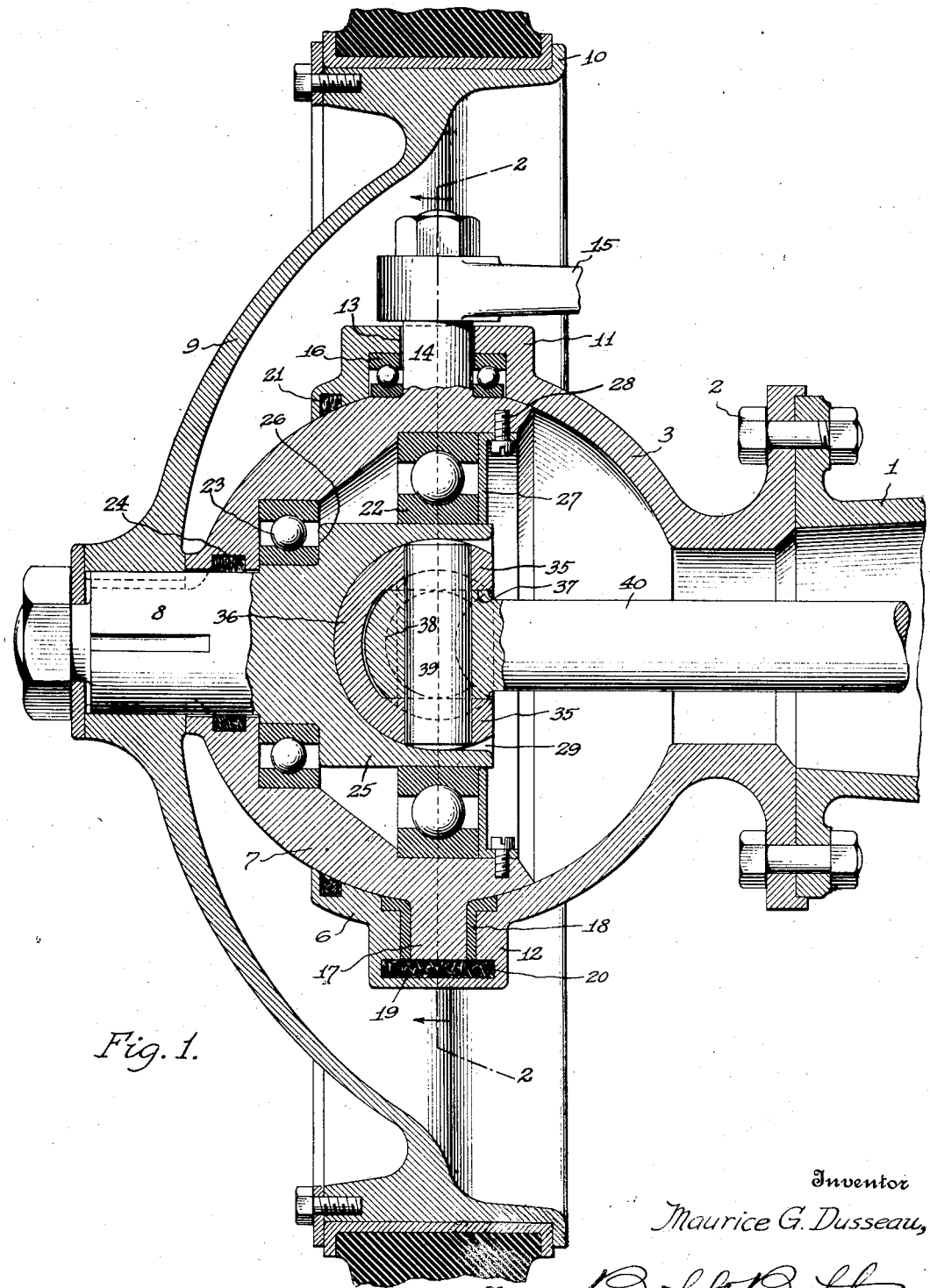
Figure 2:
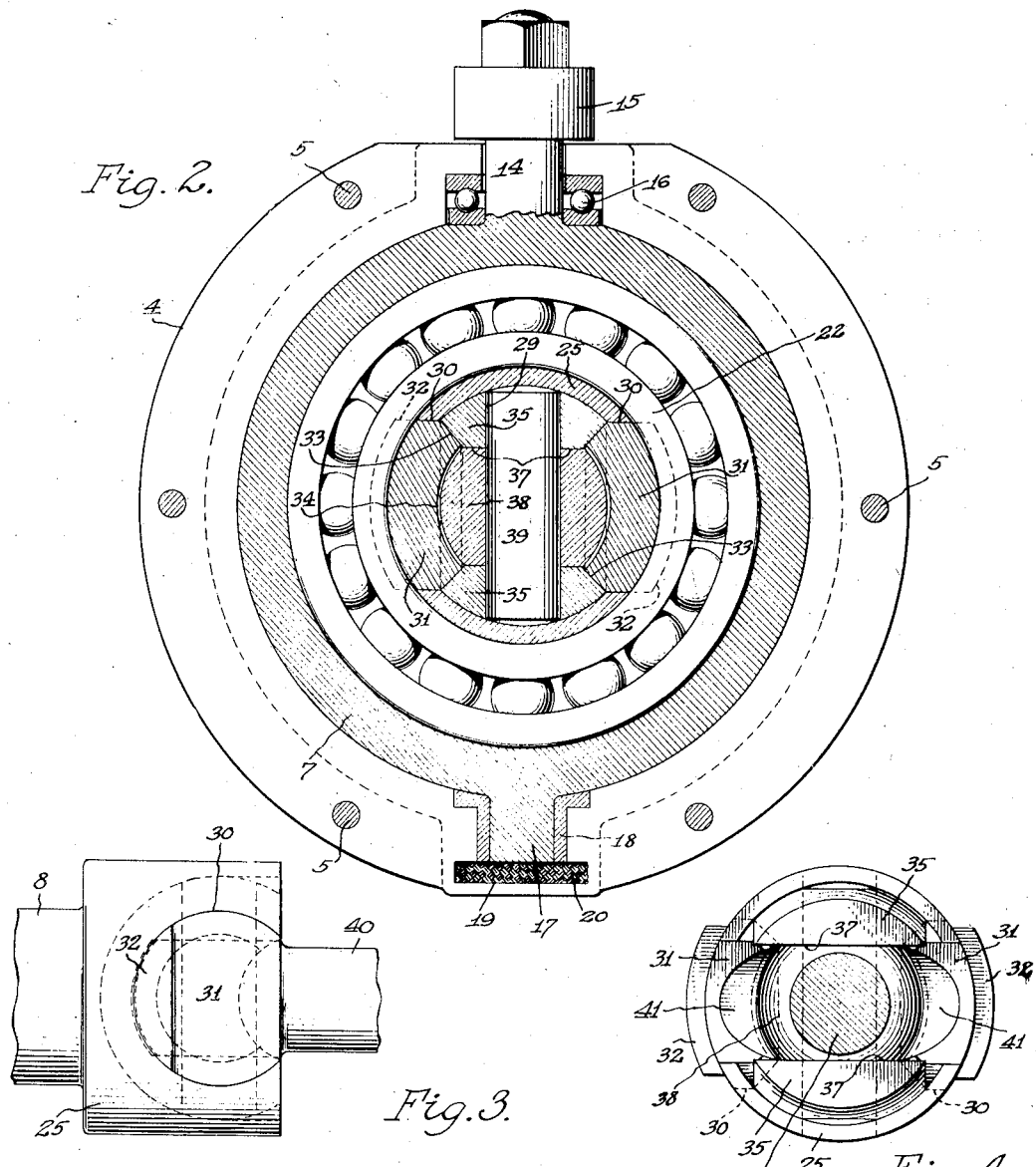
Fig. 2 is a cross sectional view taken on the line 2—2 of Fig. 1.

In the drawings the reference numeral 1 denotes a portion of a rear axle housing and attached to the end of said housing by nut equipped bolts 2 or other fastening means is a semi-spherical outer knuckle member 3 provided with a flange 4 to which is connected, by nut equipped bolts 5, a retaining member 6. This retaining member holds an inner semi-spherical knuckle member 7 within the outer member 3, and journaled in the inner knuckle member 7 is an extension drive axle or shaft 8 on which is keyed and otherwise fixed the bell hub or body 9 of a wheel 10.

The outer knuckle member 3 and the retaining member 6 are fastened to provide vertically alining bosses 11 and 12, the former having an opening 13 through which extends a spindle 14 of the inner knuckle member 7, said spindle having its outer end provided with a crank or arm 15 so that a conventional form of steering mechanism may be used for turning the inner knuckle member 7 about the axis of the spindle 14. In the bosses 11 is an anti-frictional thrust bearing 16 which assists in sustaining the weight of the rear axle assembly relative to the wheel.

Alining with the spindle 14 is another spindle 17 extending into the boss 12 and in this boss is seated a flanged bushing 18 in which rotates the spindle 17. The boss 12 is formed with a cavity or pocket 19 for a packing gland 20 which will preclude leakage of lubricant at the juncture of the outer knuckle member 3 and the retaining member 6. Any lubricant draining from the outer knuckle member 3 on to the spindle 17 cannot conveniently escape at the juncture of the outer knuckle member 3 and its retaining member 6, and to prevent possible loss of lubricant between the retaining member 6 and the inner knuckle member, said retaining member is provided with an annular groove for a packing ring 21. This packing ring prevents dust or other foreign matter from entering the outer knuckle member 3 and interfering with the bearings or spindles therein.

The inner knuckle member 7 is provided with annular seats for anti-frictional bearings, generally designated, 22 and 23, the former being in the plane of the axis of the spindles 14 and 17 or what may be considered the rotative plane of the wheel. These bearings are adapted to support the extension axle or shaft 8 and adjacent the bearing 23 is a packing ring 24 about the shaft or axle and set in the inner knuckle member 7. The extension axle or shaft 8 has a head 25 in the anti-frictional bearing 22 and said head forms a shoulder 26 against which the bearing 23 is mounted, said shoulder holding the bearing 23 on its seat in the inner knuckle member and for retaining the bearing 22 on its seat there is a retaining plate 27 fitted in the inner knuckle member 7 against the bearing 22 and about the head 25, said retaining plate being held in place by screws 28 or other fastening means.

The head 25 is provided with an open substantially semi-spherical socket 29 and the side walls of said head are provided with substantially circular opposed openings 30. In these openings are placed shoes 31 and on said shoes are abutments 32 which extend outwardly at one end of the anti-frictional bearing 22, so that with said bearing on the head 25 which is sandwiched between the plate 27 and the abutments 32, this arrangement possesses an advantage that will hereinafter appear. The shoes 31 have upper and lower beveled edges 33 and confronting concave edges 34. The edges 33 and 34 protrude into the head 25 and engaging the beveled edges 33 of the shoes 31 are the beveled edges of opposed arms 35 forming part of an outer ball member 36 placed in the socket 29 of the head 25. The arms 35 of the outer ball member have opposed flat faces 37 engaging the facets of an inner ball 38 placed in the outer ball member 36 between the shoes 31. The inner ball 38 is provided with an opening for a pin 39 which has its ends extending into the arms 35 of the outer ball member 36. The inner ball 38 is on the end of a live axle or shaft 40 extending from the housing 1 nto the outer knuckle member 3 and it is by virtue of this live axle or shaft that power is delivered to the extension axle or shaft 8 for driving the wheel 10.

The pin 39 establishes a pivotal connection for the extension axle relative to the live axle and the spindles 14 and 17 establish a similar action for the wheel relative to the outer knuckle member 3, said outer knuckle member cooperating with the inner knuckle member 7 in providing a knuckle for the anti-frictional bearings 22 and 23 and the universal joint between the axles 8 and 40.

Figure 4:
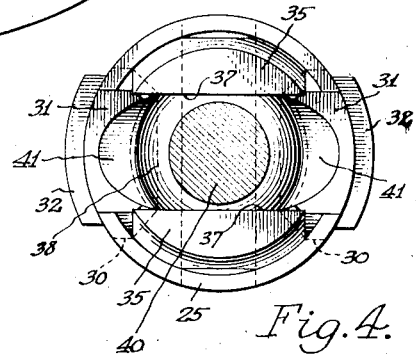
Fig. 4 is a view of the inner end thereof.
Figure 5:
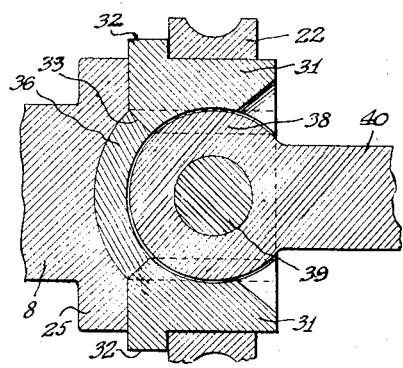
Fig. 5 is a horizontal sectional view of the universal joint.

Since the axle or shaft 8 may swing laterally relative to the axle or shaft 40 there must be clearance for the latter, therefore the shoes 31 have the outer faces thereof recessed, as at 41, and best shown in Fig. 4.

It is obvious that the arrangement of inner and outer ball members in the socket of the head 25 affords a universal connection with the shoes 31 establishing rotation between the different parts of the universal joint so that the live axle 40 may drive the extension axle 8. The shoes function for another purpose. Ordinarily the outer recessed member of the anti-frictional bearing 22 is perfectly fitted in the inner knuckle member 7, and in order that this anti-frictional bearing can be removed for removal of the plate 27, the lugs 32 are positioned behind the inner recessed member of the anti-frictional bearing, by pulling the head 25 out of the inner knuckle member 7, this being accomplished after the usual nuts or cap are removed from the outer end of the wheel hub. This is a structural advantage which facilitates assembling and disassembling the parts of the knuckle.

While in the drawings there is illustrated a preferred form of wheel assembly, it is to be understood that the structural elements are susceptible to such variations and modifications as fall within the scope of the appended claims.

What I claim is:—

1. In a wheel assembly, inner and outer knuckle members, steering means for the inner knuckle member, an extension shaft journaled in the inner knuckle member, a wheel fixed on said shaft, a drive shaft extending through said outer knuckle member into said inner knuckle member, a universal joint in said inner knuckle member articulating said shafts, an annular ball bearing supporting said joint in said inner knuckle member, said ball bearing having an inner race member on said extension shaft, and means carried by said joint and projecting laterally through said extension shaft for engaging the inner race member of said bearing whereby said joint may withdraw said bearing from said inner knuckle member.

2. In a wheel assembly wherein power is transmitted to the wheel through a knuckle by aligning shafts, and a universal joint connects the aligning shafts and is supported by a bearing in said knuckle, said universal joint comprising a socket head on one of said shafts and supported in said bearing, an outer ball member in said socket head, shoes in said outer ball member having abutments protruding from opposite sides of said socket head to engage behind said bearing, and a ball on the other shaft and pivotally connected to said outer ball member and retaining said shoes in said outer ball member.

In testimony whereof I affix my signature.

MAURICE G. DUSSEAU.